United States Patent [19]

Aoki

[11] Patent Number: 4,668,998
[45] Date of Patent: May 26, 1987

[54] TIME BASE CORRECTION FOR VTR WITH VARIABLE TAPE SPEED

[75] Inventor: Shinji Aoki, Kanagawa, Japan

[73] Assignee: Sony Corporation, Tokyo, Japan

[21] Appl. No.: 696,153

[22] Filed: Jan. 29, 1985

[30] Foreign Application Priority Data

Jan. 31, 1984 [JP] Japan .................................. 59-15458

[51] Int. Cl.⁴ ........................ H04N 5/783; H04N 5/95
[52] U.S. Cl. .................................. 360/10.3; 360/36.1;
360/62; 358/337; 358/312
[58] Field of Search .................. 360/10.1, 10.3, 36.1,
360/62, 14.1, 31; 358/337, 312, 320, 324, 311

[56] References Cited

U.S. PATENT DOCUMENTS

| | | | |
|---|---|---|---|
| 3,331,927 | 7/1967 | Bounsall | 360/14.1 |
| 4,054,921 | 10/1977 | Tatami | 360/36.2 |
| 4,115,819 | 9/1978 | Shigeta | 360/74.4 |
| 4,133,009 | 1/1979 | Kittler | 358/337 |
| 4,163,993 | 8/1979 | Ravizza | 358/312 |
| 4,329,718 | 5/1982 | Kimura | 360/36.1 |

*Primary Examiner*—Alan Faber
*Attorney, Agent, or Firm*—Lewis H. Eslinger; Alvin Sinderbrand

[57] ABSTRACT

In an apparatus in which a video signal can be reproduced from a magnetic tape that is transported with a different tape speed from that in recording, such as, in a slow or still reproducing mode, and the reproduced video signal and an input video signal can be alternatively supplied to an output terminal at every predetermined number of field intervals, there is provided a circuit for controlling a time axis of the input video signal so as to be substantially equal to the time axis of the reproduced video signal.

6 Claims, 7 Drawing Figures

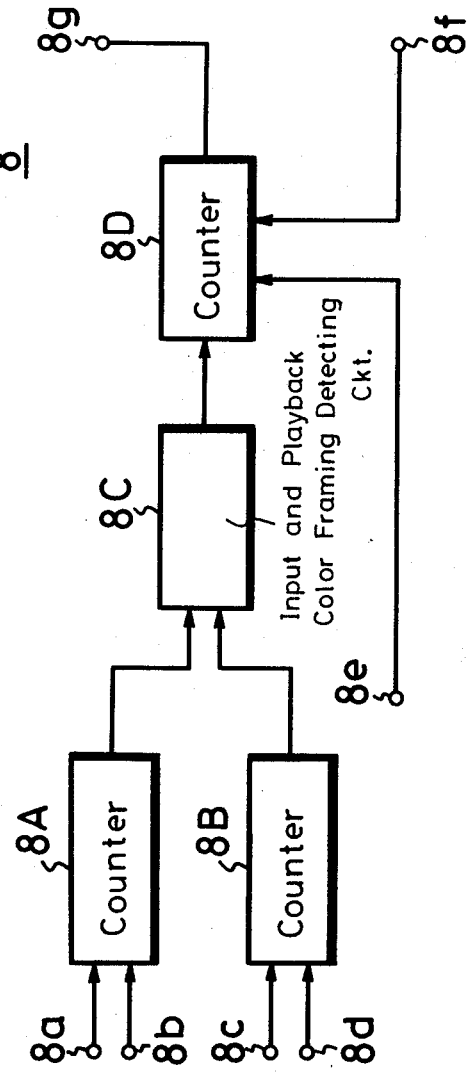

TIME BASE CORRECTION FOR VTR WITH VARIABLE TAPE SPEED

BACKGROUND OF THE INVENTION

1. Field of the Invention

This invention relates to apparatus for recording and/or reproducing a video signal and in particular, is directed to such an apparatus in which the video signal is recorded and/or reproduced with a tape speed different from the normal one.

2. Description of the Prior Art

Conventionally, it is required in a video tape recorder (hereinafter referred to as a VTR) to preview the video reproduced from a magnetic tape and an input video signal to be newly recorded. Accordingly, the VTR is provided with a switch, by which the reproduced video signal and the input video signal are switched and alternatively supplied to a monitor. When the magnetic tape is transported with the same speed as that in recording, a time axis of the input video signal substantially coincides with that of the reproduced video signal. As a result, an output video signal which comprises a mixture of the reproduced video signal and the input video signal can be displayed on the screen of a television receiver without disturbance.

On the other hand, in the event that the magnetic tape is transported with a tape speed different from the recording tape speed, the picture displayed on the television receiver will be disturbed upon switching owing to difference between the time axes of the reproduced video signal and the input video signal respectively.

OBJECTS AND SUMMARY OF THE INVENTION

It is one object of this invention to provide an improved VTR which overcomes the above-described disadvantage.

It is another object of this invention to provide a new VTR which can selectively preview an input video signal and a reproduced video signal from a magnetic tape that is transported with a tape speed different from the normal one.

In accordance with one aspect of this invention, an apparatus is provided with a circuit for controlling a time axis of the input video signal so as to be substantially equal to the time axis of the reproduced video signal.

The above, and other objects, features and advantages of the present invention, will become apparent from the following description taken in conjunction with the accompanying drawings throughout which like reference numerals designate the same elements and parts.

BRIEF DESCRIPTION OF THE DRAWINGS

FIG. 3 shows a circuit block diagram of a control circuit which is used in the VTR shown in FIG. 2; and FIGS. 4A to 4D respectively show waveform diagrams to which reference will be made in the explanation of the circuit of FIG. 3.

DESCRIPTION OF THE PREFERRED EMBODIMENT

Figure 1:
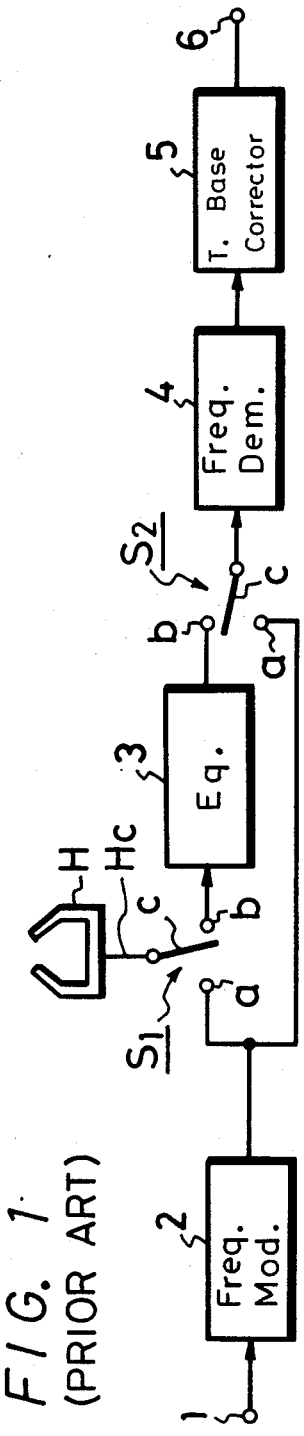
FIG. 1 shows a circuit block diagram of a conventional VTR.

In order to facilitate the understanding of the present invention, an example of the prior art VTR (video tape recorder) will be described first with reference to FIG. 1 in which an input video signal and a video signal reproduced from a magnetic tape are alternatively changed over at every field, reproduced and compared with each other so as to be previewed on the picture screen of a monitor television receiver. In this prior art VTR, the input video signal of, for example, NTSC (national television standard committee) system is applied to an input terminal 1 and then supplied to a frequency modulator 2. Reference letter H designates a record and reproduce rotary magnetic head and a coil Hc thereof is connected to a movable contact c of a change-over switch S1 having fixed contacts a and b. One fixed contact a of the change-over switch S1 is connected to the output terminal of the frequency modulator 2, while the other fixed contact b is connected to the input terminal of an equalizer 3. Reference numeral S2 designates another change-over switch which similarly comprises fixed contacts a and b and a movable contact c. One fixed contact a of the change-over switch S2 is connected to the output terminal of the frequency modulator 2, while the other fixed contact b is connected to the output terminal of the equalizer 3. The movable contact c thereof is connected to the input terminal of a frequency demodulator 4. Then, the output of the frequency demodulator 4 is supplied to a time base corrector 5 and the output from the time base corrector 5 is delivered to an output terminal 6, which then is fed to a monitor television receiver (not shown).

The operation of such prior art VTR will be described hereinafter.

When the input video signal is recorded, the movable contact c of the change-over switch S1 is positioned to engage the fixed contact a thereof. Then, the input video signal from the input terminal 1 is supplied to and frequency modulated by the frequency modulator 2. Thereafter, this video signal is supplied through the change-over switch S1 to the rotary magnetic head H and thereby recorded on a magnetic tape (not shown) which is moved at a normal tape speed.

When the input video signal and the reproduced video signal played back from the magnetic tape running at the normal tape speed are alternatively changed over, compared with each other and then previewed, the movable contact c of the change-over switch S1 is positioned to engage the fixed contact b thereof. Then, if the movable contact c of the change-over switch S2 is selectively changed in position to alternately engage the fixed contacts a and b at every field, the input video signal from the input terminal 1 and the reproduced video signal played back from the magnetic tape by the rotary magnetic head H are alternatively changed over at every field and then supplied to the frequency demoddulator 4 and thereby frequency-demodulated. Further, the frequency-demodulated video signal is fed to the time base corrector 5 in which the time axis fluctuation of the reproduced video signal is corrected and then the input video signal and the reproduced video signal are fed to the output terminal 6. Thus, the input video signal and the reproduced signal of the video signal recorded on the magnetic tape can be previewed on the picture screen of the monitor television receiver at every field. This is advantageous for so-called electronic editing.

However, if the tape speed upon reproducing the video signal is different from the tape speed in the recording mode, the time axis of the input video signal is considerably different from that of the reproduced video signal. Consequently, even if the both signals are supplied to the time base corrector 5, when these signals are changed over and supplied to the monitor television receiver as the standard video signal, the reproduced picture is disturbed upon switching, so that it is impossible to compare or preview both signals on the picture screen of the monitor television receiver.

Now, an embodiment of the VTR according to this invention will hereinafter be described with reference to FIGS. 2 and 3. In FIG. 2, like parts corresponding to those in FIG. 1 are identified by the same references and will not be described in detail.

In the example shown in FIG. 2, an input video signal (a color video signal of, for example, the NTSC system) applied to the input terminal 1 is supplied to a fixed contact b of a change-over switch S3 having another fixed contact a and a movable contact c and the input terminal of a time axis converting circuit 7. This time axis converting circuit 7 is formed of a RAM (random access memory) so as to be capable of varying a frequency of a read clock pulse relative to a write clock pulse by a predetermined ratio, and the ratio of the frequencies can properly be varied in accordance with the ratio between the tape speed of the magnetic tape in the recording mode and that in the playback mode and further in accordance with the running direction of the magnetic tape with respect to the rotation direction of the rotary magnetic head.

The input video signal with its time axis converted is supplied from the time axis converting circuit 7 to the other fixed contact a of the change-over switch S3. The movable contact c of the change-over switch S3 is connected to the input terminal of the frequency modulator 2, while the output terminal of the frequency modulator 2 is connected to a fixed contact a of a change-over switch S4 having another fixed contact b and a movable contact c and to a fixed contact a of a change-over switch S5 having another fixed contact b and a movable contact c. The movable contact c of the change-over switch S4 is connected to the coil Hc of the record and reproduce rotary magnetic head H. The other fixed contact b of the change-over switch S4 is connected to the input terminal of the equalizer 3, while the output terminal of the equalizer 3 is connected to the fixed contact b of the change-over switch S5. The output terminal of the frequency modulator 2 is connected to the other fixed contact a of the change-over switch S5. The movable contact c of the change-over switch S5 is connected to the input terminal of the frequency demodulator 4. The output terminal of the frequency demodulator 4 is connected to the input terminal of the time base corrector 5 and the output terminal 6 is led out from the output side of the time base corrector 5.

Reference numeral 8 designates a control circuit for controlling the changing over condition of the change-over switch S5 and the practical circuitry of this control circuit 8 will be described with reference to FIG. 3.

In FIG. 3, control circuit 8 is shown to include counters 8A and 8B for counting color framings 1 to 4 of the input video signal and the reproduced video signal, respectively. The counter 8A is receives a vertical synchronizing signal and a color framing pulse of the input video signal from input terminals 8a and 8b, respectively. A playback control signal and a playback color framing pulse are supplied to input terminals 8c and 8d, respectively, of the counter 8B. The outputs of the counters 8A and 8B are supplied to an input and playback color framing detecting circuit 8C which judges which of the four fields 1 to 4 of the input video signal, as shown in FIG. 4A, should be replaced by the field interval (in this case, the second field) of a field still playback video signal, for example, as shown in FIG. 4B. The output of the detecting circuit 8C is supplied to a counter 8D. From an input terminal 8e, this counter 8D is supplied with a switch control signal which is used to switch or change-over from an input video signal (EE) mode in which only the input video signal is provided at output terminal 6, and a playback video signal mode in which the input video signal and the reproduced video are alternatively provided at terminal 6. From an input terminal 8f, the counter 8D is supplied with a control signal which determines a number or a multiple (1, 2, 3, . . . ) in a case where the input video signal is to be inserted into the reproduced video signal at every predetermined number of 4 field intervals. As a result, an output terminal 8g, which is led out from the output side of the counter 8, provides a control signal as shown in FIG. 4C which controls the change-over switch S5. In the illustrated example of this switch control signal, at every 4 field intervals, the second field of the reproduced video signal is changed over or replaced by the second field of the input video signal. FIG. 4D illustrates a waveform of an output video signal which is developed at the output terminal 6 (FIG. 2). From FIG. 4D, it is clear that the reproduced video signal PB is obtained at the first, third and fourth fields, while the input video signal EE is obtained at the second field.

Referring back to FIG. 2, the operation of the VTR according to this invention will now be described. When the input video signal is recorded, the movable contact c of the change-over switch S3 is positioned to engage to the fixed contact b and the movable contact c of the change-over switch S4 is positioned to engage the fixed contact a. As a result, the input video signal from the input terminal 1 is supplied to the frequency modulator 2 to be frequency-modulated thereby and then supplied through the change-over switch S4 to the rotary magnetic head H. Thus, the input video signal is recorded on the magnetic tape (not shown) which is transported at the normal tape speed so as to form a recorded pattern which is the same as that of a prerecorded magnetic tape transported at the normal tape speed.

When the input video signal and the video signal reproduced from the magnetic tape in the stop mode are to be alternatively provided at output terminal 6, the reproduced video signal is obtained from a tape moving at a tape speed substantially different from that of the recording mode so that the movable contact c of the change-over switch S3 is positioned to engage the fixed contact a and the movable contact c of the change-over switch S4 is positioned to engage to the fixed contact b. Accordingly, even when the video signal recorded on the magnetic tape while running at the normal tape speed is reproduced in the still playback mode, the time axes of the reproduced video signal and the input video signal become the same. When the movable contact c of the change-over switch S5 is changed in position relative to the fixed contacts a and b by the control circuit 8 as mentioned above, the input video signal from the input terminal 1 and the video signal reproduced from the magnetic tape by the rotary magnetic head H alternatively appear at the movable contact c of the change-over switch S5 FIG. 4D. Then, the input video signal and the reproduced video signal are supplied to and frequency-demodulated by the frequency demodulator 4 and the resulting demodulated video signal is supplied to the time base corrector 5 in which the time axis fluctuation thereof is corrected. Thus the input video signal and the reproduced video signal are alternatively provided at the output terminal 6. As a result, the input video signal and the reproduced video signal obtained from the video signal recorded on the magnetic tape can be compared with each other or previewed on the picture screen of the monitor television receiver. This is advantageous for electronic editing.

It will be appreciated that, if the movable contact c of the change-over switch S5 is maintained in engagement with the contact a thereof by the control circuit 8, only the input video signal can be supplied to the monitor television receiver.

Figure 2:
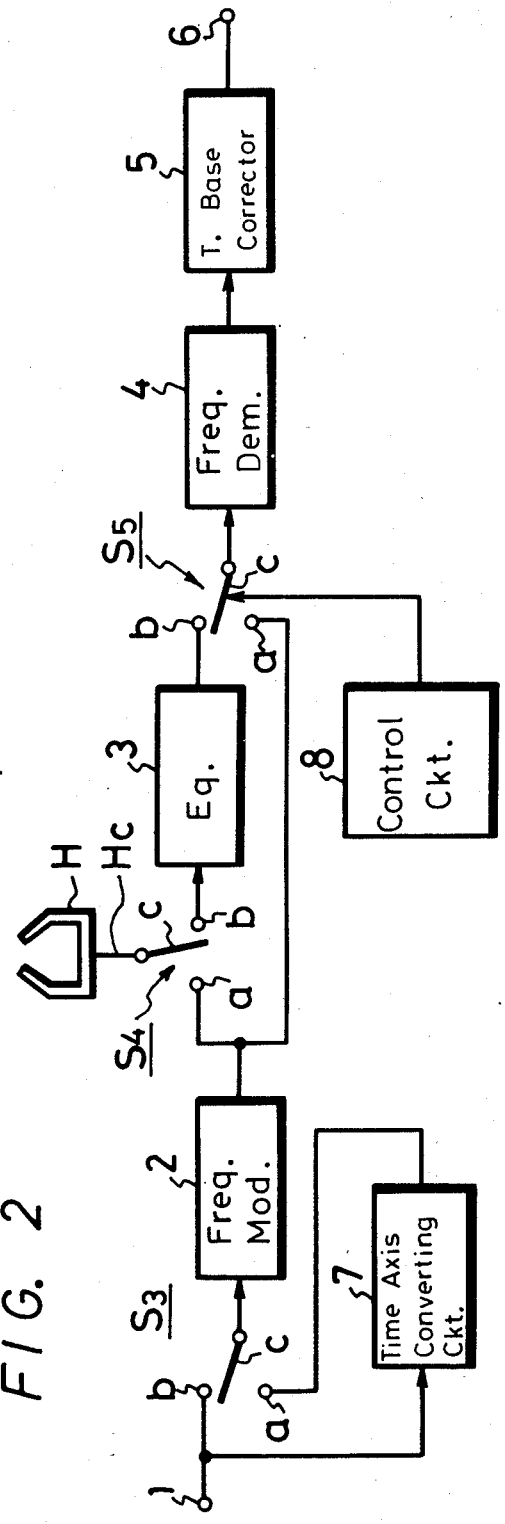
FIG. 2 shows a circuit block diagram of one embodiment of the VTR according to this invention.

When the movable contact c of the change-over switch S3 is changed in position to engage the fixed contact b thereof, in effect, the input terminal 1 is connected directly to the frequency modulator 2 similarly to FIG. 1, the video signal recorded on the magnetic tape running at the normal tape speed and being played back from the magnetic tape running at the normal tape speed and the input video signal can be changed over at every field.

Although, in the above example, the present invention is applied to a VTR which records and reproduces the video signal of the NTSC system, this invention can also be applied to a VTR which records and reproduces a video signal of the PAL (phase alteration line) system, the PAL-M (phase alteration line-modified) system and the like.

Further, although there has been described the case in which the recorded video signal is reproduced from the tape in the field still playback mode, the present invention can also be applied to a playback mode with a different tape speed, such as, a frame still playback mode, a slow motion playback mode, a high speed playback mode and so on.

When the video signal is a black and white signal, it is only necessary to match the odd and even fields in switching between the input video signal and the reproduced video signal.

Having described a single preferred embodiment of the invention, it will be apparent that the invention is not limited to that precise embodiment, and that many modifications and variations could be effected therein by one skilled in the art without departing from the spirit or scope of the invention defined by the appended claims.

I claim as my invention:

1. Apparatus for alternatively providing an input video signal and a reproduced video signal which is recorded on a recording tape, said recording tape being transported, during reproducing, with a tape speed different from that used in recording, said apparatus comprising:
    input means receiving said input video signal;
    reproducing means for reproducing the recorded video signal from said recording tape;
    output means;
    switching means connected with said reproducing means, said input means and said output means for selectively supplying to said output means a reproduced video signal from said recording tape and an input video signal from said input means; and
    means connected between said input means and said switching means for controlling a time axis of said input video signal in accordance with a ratio of the recording tape speed to the reproducing tape speed and with the relation of a tape running direction to a head rotating direction so as to make said time axis of the input video signal substantially coincide with a time axis of said reproduced video signal.

2. Apparatus according to claim 1, in which said means for controlling the time axis comprises a random access memory into which said input video signal is written in accordance with a standard clock signal, and from which said input video signal is read out in accordance with a reading clock signal having a frequency which is determined by a ratio of said ratio of the recording tape speed to the reproducing tape speed and by said relation of the tape running direction to the head rotating direction.

3. Apparatus according to claim 1, in which said reproduced video signal is frequency modulated, and further comprising means connected between said means for controlling the time axis and said switching means for similarly frequency-modulating said input video signal.

4. Apparatus according to claim 3, further comprising means connected between said switching means and said output means for frequency-demodulating said reproduced video signal and said input video signal from said frequency-modulating means.

5. Apparatus for alternatively providing an input video signal and a reproduced frequency modulated video signal which is recorded on a recording tape, said recording tape being transported, during reproducing, with a tape speed different from that used in recording, said apparatus comprising:
    input means receiving said input video signal;
    reproducing means for reproducing the recorded video signal from said recording tape;
    output means;
    switching means connected with said reproducing means, said input means and said output means for selectively supplying to said output means a reproduced video signal from said recording tape and an input video signal from said input means;
    means connected between said input means and said switching means for controlling a time axis of said input video signal so as to substantially coincide with a time axis of said reproduced video signal;
    means connected between said means for controlling the time axis and said switching means for frequency-modulating said input video signal similarly to said reproduced video signal;
    means connected between said switching means and said output means for frequency-demodulating said reproduced video signal and said input video signal from said frequency-modulating means; and
    means for generating a switch control signal which is supplied to said switching means and which comprises first counter means for detecting a field number of said input video signal, second counter means for detecting a field number of said reproduced video signal and means for detecting a coincidence of said field numbers of said input and reproduced video signals and producing said switch control signal upon detection of said coincidence.

6. Apparatus for alternatively providing an input video signal and a reproduced video signal which is recorded on a recording tape, said recording tape being transported, during reproducing, with a tape speed different from that used in recording, said apparatus comprising:
  input means receiving said input video signal;
  reproducing means for reproducing the recorded video signal from said recording tape;
  output means;
  switching means connected with said reproducing means, said input means and said output means for selectively supplying to said output means a reproduced video signal from said recording tape and an input video signal;
  means connected between said input means and said switching means for controlling a time axis of said input video signal so as to substantially coincide with a time axis of said reproduced video signal; and
  means for generating a switch control signal which is supplied to said switching means and which comprises first counter means for detecting a field number of said input video signal, second counter means for detecting a field number of said reproduced video signal and means for detecting a coincidence of said field numbers of said input and reproduced video signals and producing said switch control signal upon detection of said coincidence.

* * * * *